(12) United States Patent
Hollingworth

(10) Patent No.: US 10,630,145 B2
(45) Date of Patent: Apr. 21, 2020

(54) DEVICE IN A HEAT CYCLE FOR CONVERTING HEAT INTO ELECTRICAL ENERGY

(71) Applicant: NODITECH AB, Norrkoping (SE)

(72) Inventor: Hardy Hollingworth, Kåreholm (SE)

(73) Assignee: NODITECH AB, Nörrköping (SE)

( * ) Notice: Subject to any disclaimer, the term of this patent is extended or adjusted under 35 U.S.C. 154(b) by 0 days.

(21) Appl. No.: 15/544,824

(22) PCT Filed: Jan. 14, 2016

(86) PCT No.: PCT/SE2016/050013
§ 371 (c)(1),
(2) Date: Jul. 19, 2017

(87) PCT Pub. No.: WO2016/118062
PCT Pub. Date: Jul. 28, 2016

(65) Prior Publication Data
US 2017/0373561 A1 Dec. 28, 2017

(30) Foreign Application Priority Data
Jan. 19, 2015 (SE) ...................................... 1530005

(51) Int. Cl.
*H02K 7/00* (2006.01)
*H02K 7/18* (2006.01)
(Continued)

(52) U.S. Cl.
CPC ............. *H02K 7/1892* (2013.01); *F01K 7/00* (2013.01); *F01K 27/00* (2013.01); *F25B 6/02* (2013.01);
(Continued)

(58) Field of Classification Search
CPC ...... H02P 9/04; H02P 2103/20; H02K 7/1892; H02K 7/1884
(Continued)

(56) References Cited

U.S. PATENT DOCUMENTS 1,837,620 A * 12/1931 Karl .......................... F01L 7/02
123/23
2,659,194 A * 11/1953 Huber ...................... F02B 71/06
123/46 SC
(Continued)

FOREIGN PATENT DOCUMENTS

CN 101229776 A 7/2008
GB 2472604 A 2/2011
(Continued)

OTHER PUBLICATIONS

Chinese First Office Action for Chinese Application No. 201680004554.6, dated Jan. 17, 2019 (9 pages).
(Continued)

*Primary Examiner* — Julio C. Gonzalez
(74) *Attorney, Agent, or Firm* — Kagan Binder, PLLC

(57) ABSTRACT

A converting device arranged to transfer thermodynamic energy of a compressed working fluid into electrical energy. The converting unit is comprised of at least one cylinder which encloses a piston. In an embodiment, said at least one piston is provided with a magnetic portion. A ferromagnetic coil surrounds the piston and is integrated with the cylinder. As the piston moves through the coil, electrical energy is generated.

17 Claims, 4 Drawing Sheets

(51) Int. Cl.
  F25B 30/02    (2006.01)
  F25B 11/02    (2006.01)
  F25B 6/02     (2006.01)
  F01K 27/00    (2006.01)
  F01K 7/00     (2006.01)
  H02P 9/04     (2006.01)
  H02P 103/20   (2016.01)

(52) U.S. Cl.
  CPC .............. *F25B 11/02* (2013.01); *F25B 30/02* (2013.01); *H02K 7/1884* (2013.01); *H02P 9/04* (2013.01); F25B 2339/047 (2013.01); F25B 2400/141 (2013.01); H02P 2103/20 (2015.01)

(58) Field of Classification Search
  USPC ...... 290/1 A, 52; 310/13, 15, 20, 30, 35, 37; 123/46 R
  See application file for complete search history.

(56) References Cited

U.S. PATENT DOCUMENTS

| | | | | |
|---|---|---|---|---|
| 3,200,800 A * | 8/1965 | Du Bois | ................ | F01B 9/026 123/197.1 |
| 3,234,395 A * | 2/1966 | Colgate | ................ | F02B 71/04 123/46 E |
| 3,675,031 A * | 7/1972 | Lavigne | ............... | H02K 7/1884 123/46 E |
| 3,766,399 A * | 10/1973 | Demetrescu | ......... | H02K 7/1884 123/46 E |
| RE30,176 E * | 12/1979 | Beale | .................... | F02G 1/0435 60/520 |
| 4,305,349 A * | 12/1981 | Zimmerly | ................. | F01B 7/12 123/51 B |
| 4,480,599 A * | 11/1984 | Allais | ..................... | F02B 45/00 123/23 |
| 4,500,827 A * | 2/1985 | Merritt | ................... | H02K 35/04 290/1 R |
| 4,532,431 A * | 7/1985 | Iliev | ........................ | F02B 63/04 123/46 E |
| 4,785,770 A * | 11/1988 | Yang | ....................... | F02B 33/08 123/71 R |
| 4,945,269 A * | 7/1990 | Kamm | ................... | H02K 33/00 310/12.21 |
| 5,002,020 A * | 3/1991 | Kos | .......................... | B60K 6/22 123/46 E |
| 5,850,111 A * | 12/1998 | Haaland | ................. | H02K 44/24 310/15 |
| 5,884,590 A * | 3/1999 | Minculescu | ........... | F02B 33/10 123/53.3 |
| 6,541,875 B1 * | 4/2003 | Berlinger | ................ | F02B 71/04 123/46 E |
| 7,378,765 B2 * | 5/2008 | Iwasa | ..................... | H02K 33/00 310/14 |
| 7,622,814 B2 * | 11/2009 | Hyde | ...................... | F02B 75/32 290/1 R |
| 7,832,207 B2 * | 11/2010 | McBride | ................ | F15B 1/024 60/410 |
| 8,610,320 B2 * | 12/2013 | Kobayashi | ............... | B60K 6/24 123/46 E |
| 8,616,162 B2 * | 12/2013 | Najt | ...................... | F01B 11/007 123/46 A |
| 2003/0024492 A1 * | 2/2003 | Malmquist | ............... | B60K 6/46 123/46 E |
| 2010/0283263 A1 | 11/2010 | Schilling | | |
| 2012/0017635 A1 | 1/2012 | Eisenhour | | |
| 2013/0088018 A1 | 4/2013 | Kobayashi | | |

FOREIGN PATENT DOCUMENTS

| | | |
|---|---|---|
| WO | 0145977 A2 | 6/2001 |
| WO | 0188353 A1 | 11/2001 |
| WO | 2011012299 A2 | 2/2011 |
| WO | 2013141805 A1 | 9/2013 |

OTHER PUBLICATIONS

E-spacenet English Abstraot of CN 101229776.
E-Space abstract for WO2011012299A2.

* cited by examiner

DEVICE IN A HEAT CYCLE FOR CONVERTING HEAT INTO ELECTRICAL ENERGY

TECHNICAL FIELD

The present invention relates to a device in a heat cycle in which a working fluid absorbs heat from a medium, which may be a gas or a fluid, and in which said heat in the heat cycle is at least partly emitted in a converting unit in the heat cycle. The device is designed to convert the emitted heat into electrical energy.

PRIOR ART

Machines that utilize a heat cycle, in which a working fluid is utilized for transporting heat from a first medium to a second medium with the aid of a compressor compressing and transporting the working fluid, have become more widely used in recent years. For example, heat pumps are used for extracting energy from rock, ground or lakes. In the refrigeration technology, heat pumps are used to cool foodstuffs, dwellings or for other purposes, where in these cases it is the objects that are to be cooled which constitute the heat source in a heat cycle. In the following, therefore, the concept heat pump will be used for all of those types of machines which transport heat in the manner described, whether the intended use is to heat or to cool.

In a heat pump, a fluid operates which cyclically in a circuit passes through a compressor, a condenser and an evaporator, whereby the fluid emits heat and absorbs heat, respectively, during the cycle. The heat pump here operates in a reversible Carnot process in a known manner, where the fluid receives an amount of heat $Q_c$ from a medium with a low temperature and emits the amount of heat $Q_h$ to a medium with a higher temperature. For this process to be effected, work must be supplied according to the following proposition $$W=Q_h-Q_c$$

The efficiency of the process may be described as follows:

$$\eta=(Q_h-Q_c)/Q_c=1-T_c/T_h$$

where $T_c$ temp. applies to the cold source and $T_h$ temp. applies to the hot source.

Usually, in connection with heat pumps, also the concept coefficient of performance, COP, is used, which may be used to assess the efficiency of a heat pump. For a reversible Carnot process, the coefficient of performance is written as follows:

$$COP_{H,rev}=1/(1-T_c/T_h)=T_h/(T_h-T_c),$$

which denotes the amount of heat that can be moved to the hot source from the cold source per input unit of work and is usually only designated COP and is often referred to as the COP value.

With the globally rising prices of energy of various kinds, solutions involving heat pumps have increased significantly during the last decades, and a great deal of development and resources are invested by various operators to render heat pumps more efficient. For heat pumps today, coefficients of performance (COP values) of around 5 are achieved. This means that the heat pump optimally delivers 5 times as much energy as it consumes. Such optimum values may be achieved for, for example, heat pumps for geothermal heating, in which geothermal heat is utilized as the cold source for heating consumers with low requirements for temperature, for example for heating dwellings.

Currently, considerable efforts are made to further increase the efficiency of heat pump systems. However, it has proved that it is difficult to reach further, since the technology has already been sophisticated to attain the high COP values mentioned above, among other things by introducing high-efficiency plate heat exchangers, low-energy centrifugal pumps, more energy-efficient scroll compressors and optimized refrigerant mixtures (i.e. the working fluids that complete the cycle in a heat pump cycle). Further, resources have been spent on achieving sophisticated control systems for controlling the cycle of the heat pump in an optimum way. Thus, it seems as if the technology has reached a limit that is difficult to exceed, other than by possibly increasing the coefficient of performance by tenths, when using conventional instruments.

In the prior art, in a circuit for a heat pump, a working fluid is used which is a medium which during the cycle in the heat pump is transformed between different states of liquid, liquid/gaseous mixture and gas. The working fluid completes the cycle by being compressed, in a first stage in gaseous state from a first state with a low pressure $p_l$ and a low temperature $t_l$, to a second state with a high pressure $p_h$ and a high temperature $t_h$. Thereafter, the working fluid is heat-exchanged in a condenser in which the working fluid is cooled by a first medium belonging to a heat cycle, thus assuming a third state with a pressure $p_m$ and a temperature $t_m$, whereby $p_l<p_m<p_h$ and $t_l<t_m<t_h$. The working fluid is then forwarded to an evaporator and is heat-exchanged therein with a second medium belonging to a collector circuit, where this second medium emits heat to the working fluid, whereby the working fluid expands and essentially returns to the pressure and the temperature that prevail in the first state.

The prior art described may be exemplified by means of a heat pump that absorbs heat from, for example, the bedrock and emits heat in a heating system for, for example, a dwelling. In such a heat pump, the necessary work in the compression of the working fluid is usually supplied by means of a compressor driven by an electric motor, which is here said to deliver the power P to the heat pump circuit. During the cycle, the working fluid, in the most optimal utilization, when the coefficient of performance amounts to 5, will, in the condenser, deliver a power 5P to the first medium that completes a heat circuit, which is utilized in said heating.

During the passage through the condenser, the working fluid is cooled and will thus, as mentioned above, assume a state of a gaseous/liquid mixture. This mixture is passed further via a throttle valve to the evaporator, whereby the mixture is essentially given a liquid state, whereafter the working fluid in liquid state now expands into a working fluid in gaseous state. The steam generation heat that is required for the evaporation is absorbed in this case from the second medium which also circulates in the evaporator for heat exchange with the working fluid. In this case, the absorbed power is 4P. The second medium completes a collector circuit, which in the current example contains the second medium which in a suitable way is adapted to circulate in the rock for absorbing heat from the bedrock. In the prior art devices, the compressor, condenser and evaporator are designed in such a way as to supplement one another in an optimum manner and to deliver to the heat circuit the power that is required for the application in question.

When a heat pump is used for cooling purposes, the working fluid, possibly via some heat exchanger, may absorb heat directly from the object or objects which are to be cooled (e.g. foodstuffs or indoor air) and thus constitutes the equivalent of an evaporator. In the heat cycle, heat is emitted from the working fluid in this case to ambient air or in a heat exchanger to a medium that transports away absorbed heat. This then takes place in a device corresponding to the condenser, as mentioned above.

As prior art, reference can be made to the publication WO 2013/141805 A1. This publication describes utilization of energy contents in a working fluid in a heat cycle. Everything described in said document is incorporated in its entirety in the present patent application. Another publication that shows energy absorption from a working fluid according to the above for converting heat into electrical energy is WO 2005/024189 A1. According to the latter document, maximum extraction of refrigerant is desired in an evaporator, whereby a further condenser is used in the heat cycle. In addition, heat is not converted into electrical energy in the manner described in the present text.

It is an object of the present invention to present a heat pump cycle that demonstrates a more efficient utilization of heat contained in a working fluid in a heat cycle when converting this heat into electrical energy.

DESCRIPTION OF THE INVENTION

The present invention presents a device in a heat cycle in a heat pump, wherein a working fluid is used to absorb heat contained in a medium that is heat-exchanged with the working fluid in an evaporator, whereafter the working fluid after absorption of heat in the evaporator is compressed and given a higher pressure and a higher temperature in a compressor, whereby in said processes thermodynamic energy is supplied to the working fluid, and that the device is designed to convert at least part of the energy contents in the working fluid downstream of the compressor into electrical energy, and that the working fluid, after passage through the device, is returned to the evaporator for completing a circuit in the heat cycle.

The device is constituted by a converting unit which comprises at least one closed cylinder which, in turn, encloses a piston that is movable in the longitudinal direction of the cylinder. Preferably, more than one such mentioned cylinder is used, for example a device with three cylinders interconnected into one unit to render the utilization of available energy more efficient. The working fluid is supplied to said cylinder alternately at the ends of the cylinder via control valves arranged at the inlets of the cylinder. Since the working fluid in this position occurs in gaseous state with a high pressure and a high temperature, this gas will, in a first stage, press the piston on its upper side with a force inwardly against the opposite, other end of the cylinder, that is, against that side which is opposite in relation to the first end of the cylinder where the gas is injected. When the piston is thrown against the other end of the cylinder, already expanded gas, present in the room in front of the lower side of the piston, is pressed out via an outlet at said other end. In a subsequent sequence of the process, the sequence is changed such that the working fluid is supplied to the other end of the cylinder via a control valve at a second inlet, whereby the process is repeated in the reverse direction.

The contents of energy in the working fluid in the form of heat and pressure will thus, by expansion under pressure drop and temperature drop, influence said piston to mechanically move in a reciprocating motion linearly inside the cylinder.

A magnet is integrated with the piston and a coil, into which electric voltage may be induced, is arranged adjacent to the cylinder in such a way that the coil surrounds the piston magnet during its linear reciprocating motion in the cylinder, whereby electrical energy is generated by transfer of energy contents in the working fluid into electrical energy. It should be stated here that at least a portion of the piston is magnetized as a permanent magnet and thus the magnet is in its entirety housed inside the cylinder encapsulating the piston. The coil is thus built into the cylinder wall, i.e. the envelope surface, built together with the envelope surface or arranged along the interior of the envelope surface of the cylinder in dependence of the design of the piston. In this configuration, no mechanical parts, like piston rods or the like, will be present outside the cylinder. This is advantageous when more than one cylinder is arranged in a block forming an energy converting battery of cylinders of the kind described herein.

The piston in the cylinder may be designed in different ways. In one example, the piston is in the form of a rod at the ends of which piston discs are applied. In this case, the piston rod between the piston discs is of metal which is permanent-magnetic. The coil is arranged at the midportion of the cylinder, such that the piston rod may run in a reciprocating motion inside the coil through a hole therein, whereby the coil in this case is arranged adjacent to the cylinder wall inside the envelope surface. In another embodiment, a free-flying piston is used, which is designed to run freely between the ends of the cylinder. In this variant, the coil is integrated with the cylinder wall, i.e. its envelope surface, and the piston arranged to be permanent-magnetic. The piston may be only partly magnetized. In the example with the piston having discs at its ends, only the piston rod is permanently magnetized. In use of a free flying piston, the piston can be permanently magnetized in its entirety. The converting unit described here is designated Linear hot-gas generator.

The present invention constitutes a modification of a heat pump circuit according to the prior art. To this end, the primary aim has been to arrange the heat pump circuit, with certain means, such that more heat is absorbed from the collector circuit in a plant with a predetermined heating/cooling requirement. To achieve this, an electric motor driving the compressor may be arranged to deliver more power to a compressor which is overdimensioned in relation to what is required to produce the necessary power to the heat circuit in the condenser, or, in case of cooling machines, the power that is required to be absorbed in the evaporator. By this measure, in case of a certain coefficient of performance, additional energy will be supplied to the working fluid in the heat pump circuit. This additionally supplied energy to the heat cycle cannot be fully delivered at the condenser since the heat cycle is designed for said required power. Instead, a bypass of the condenser is arranged from the outlet of the compressor and further to the inlet of the evaporator. In this bypass, a converting unit according to the present invention is arranged in the gas flow from the compressor. The flow of hot gas with a high pressure and a high temperature out of the compressor is thus split up and passed, partly to the condenser, partly to the converting unit. That part of the flow which traverses the converting unit and is then returned to the compressor without passing the condenser is flowing in a circuit which is here referred to as a converting circuit. Both the circuit which comprises the condenser and the converting circuit are traversed by the working fluid which is thus compressed, condensed and expanded in a similar manner in both the subflows. This means that the working fluid completes a Carnot cycle in the known manner, whereby the coefficient of performance for both subflows of the working fluid in the complete heat pump circuit may be assigned a coefficient of performance that may amount to 5. That subflow of the working fluid which traverses the converting unit in the converting circuit is condensed to a gaseous/liquid mixture and thereby undergoes a process that resembles the conversion of gas from the second state to the third state in the sublow that passes the condenser. The converting unit is traversed by the hot gas flow and converts energy in the steam into mechanical energy which in turn is transferred into electrical energy via the linear generator that is integrated into the converting unit by means of said coil and movable magnet. This electrical energy may be used for operation of the electric motor that drives the compressor or is delivered out onto an electric network.

According to one aspect of the invention, a device with the characteristic features according to claim 1 is descriptively illustrated. A heat cycle utilizing the device of claim 1 is presented in the independent device claim 10.

Further embodiments of the invention are presented in the dependent claims.

A number of examples of heat cycles in which the device according to the invention is installed are shown in the dependent claims.

One advantage of the converting unit according to the invention is that it makes possible the use of a resource, previously not fully utilized, in the form of a surplus of pressure and heat in the heat pump circuit. In addition, the invention contributes to an improvement of the environment since considerably less electrical energy is consumed for a certain energy production in the form of an energy transfer in a heat pump. The potential of the invention may thus be great since its field of application is wide within the whole area of cooling/heating technology independently of the power range in question.

Further advantageous embodiments of the invention are disclosed in the detailed description of the invention.

DESCRIPTION OF EMBODIMENTS

To implement the invention, a number of embodiments thereof will be presented, reference also being made to the accompanying drawings.

Figure 1A:
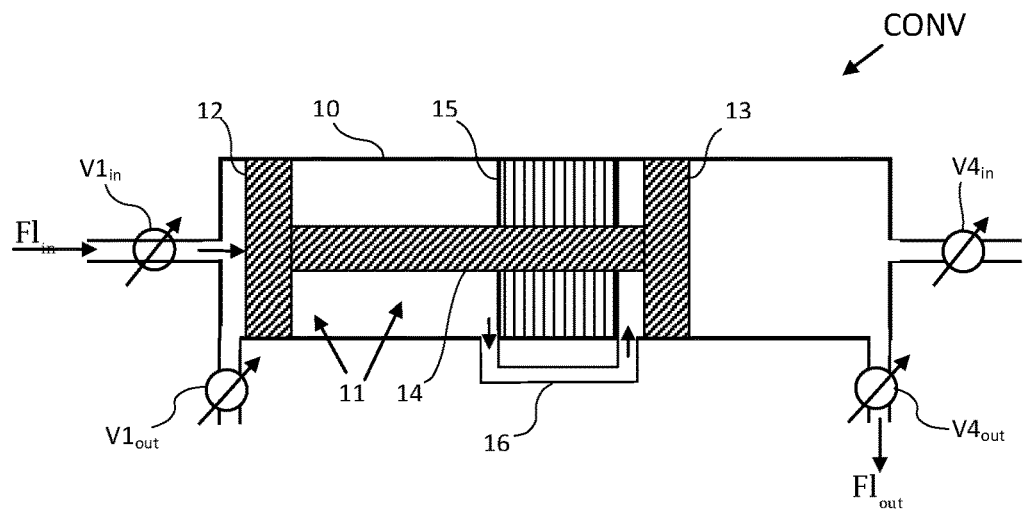
FIGS. 1a and 1b show schematic representations of one example of a single-cylinder converting unit according to one aspect of the invention.
Figure 1B:
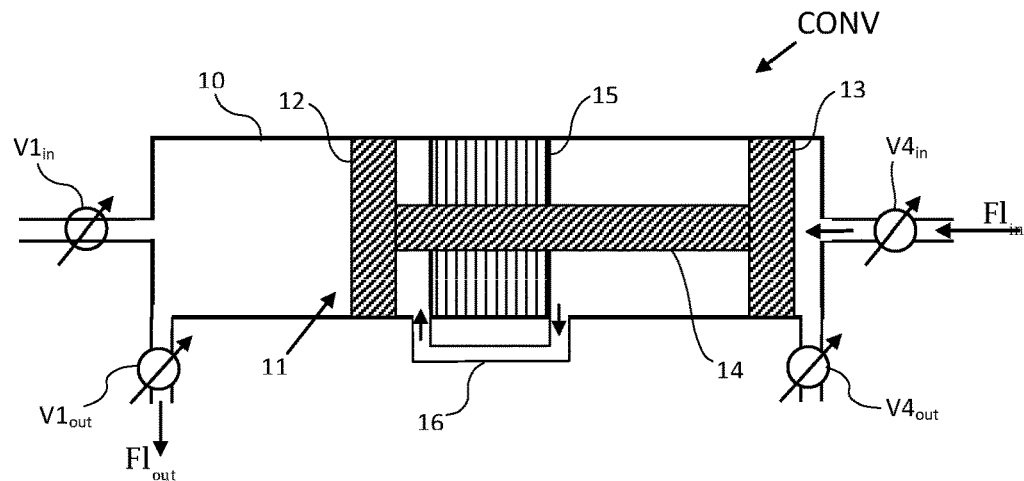

FIGS. 1a and 1b show an example of the device according to one aspect of the invention, which is here represented as a converting unit CONV. The converting unit CONV is intended to convert energy available in, for example, a working fluid which has been compressed in a heat cycle in a heat pump into electrical energy. Thus, the working fluid is pressurized and has a high temperature. Examples of such heat cycles in which the converting unit is used will be described further on.

FIGS. 1a and 1b show a first simple and fundamental embodiment of a converting unit. In this case, FIG. 1a shows a cylinder 10. At a control valve $V1_{in}$, hot, pressurized gas F1 is introduced, which in the examples consist of the working fluid in a heat cycle. In the cylinder 10, a piston 11 is arranged. The piston 11 may run in a reciprocating motion between the two ends of the cylinder. At the respective ends of the piston, piston discs 12 and 13 are formed, and these piston discs are joined by a rod, here designated piston rod 14. The piston discs are provided with seals against the walls of the cylinder 10. The piston may be made in one piece or be in the form of a piston rod 14 with the piston discs 12 and 13 mounted at the ends of the piston rod. Inside the cylinder, a coil 15 is mounted centrally in the cylinder 10 in such a way that it surrounds the piston rod 14 and seals against this in a gas-tight manner, the piston rod thus passing through said coil 15 upon running motion in the longitudinal direction of the cylinder 10. The piston rod 14 is made of a material that is permanent-magnetic. By this arrangement, an electric voltage is induced in the coil 15 when the piston rod 14 moves through it.

When the gas F1 is controlled to flow through the valve $V1_{in}$ and hits the outwardly facing surface of the first piston disc 12, the piston is thrown against the other end of the cylinder 10 (according to FIG. 1a). Gas which is present in the space in front of the outwardly facing surface of the second piston disc 13 is thus pressed out from the cylinder 10 via the simultaneously open valve $V4_{out}$. Valves $V1_{out}$ and $V4_{in}$ are shut during this first phase of the process. An overflow channel 16 ensures that gas contained in the space between the two piston discs 12, 13 may flow freely between the spaces which are formed between the piston discs 12, 13 and the coil 15, whereby pressure equalization is provided between these two spaces during the time when the piston is running. An electric voltage is induced into the coil 15. When the piston 11 reaches its end position at the end of the cylinder 10, the process is run in the reverse direction, see FIG. 1b. Valves $V1_{in}$ and $V4_{out}$ are kept shut in a second piston stroke while valves $V4_{in}$ and $V1_{out}$ are opened. In a corresponding way as in the first stroke with the piston 11, described above, the piston 11 is now thrown in the opposite direction in relation to the first stroke. Expanded gas is let out at the valve $V1_{out}$. A new voltage impulse is generated in the coil during this opposite stroke of the piston. The process consequently shows a two-stroke process, where electric voltage is generated at each stroke of the piston 11. The gas F1 forwarded to the cylinder has a pressure of around 20 kPa, as an example, and a temperature in the order of magnitude of 60 to 120° C. After the expansion in the cylinder, the gas pressure has been reduced to the order of magnitude of 5-6 5 kPa whereas the temperature has dropped to the range of 10 to 30° C.

Figure 2:
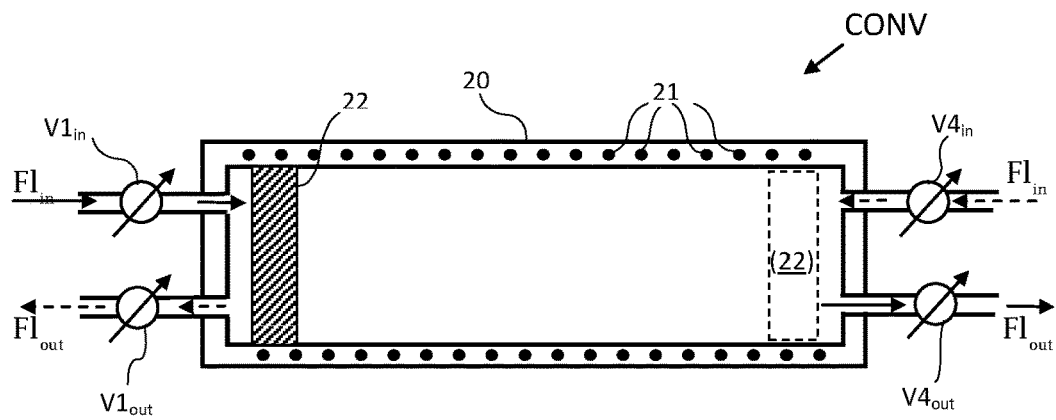
FIG. 2 shows a variant of a single-cylinder converting unit.

FIG. 2 illustrates a variant of a cylinder 20 for the converting unit CONV. In this variant, the cylinder is provided with a coil 21 that is integrated with the envelope surface of the cylinder 20 (the coil being illustrated by dots marking cross sections of wires in the wire turns of the coil). The coil may, for example, be cast into the cylinder wall. According to this variant a free-flying piston 22 is used, which may run in a reciprocating motion between the ends of the cylinder 20. In this case the piston is adapted to be permanently magnetic. In this way, the piston 22 will induce an electric voltage in the coil 21 at the respective strokes of the piston 22 in the cylinder 20. In a manner corresponding to that shown in the alternative according to FIGS. 1a and 1b, valves $V1_{in}$, $V4_{out}$, $V4_{in}$, and $V1_{out}$ are opened and shut concurrently with the respective stroke of the cylinder according to FIGS. 1a and 1b. This will cause the gas F1 to flow into the cylinder and influence the piston 22 to be thrown, in a first stroke, against the righthand end of the cylinder in the figure and, in a second stroke, to be thrown against the lefthand end of the cylinder in the figure. The piston 22 may be provided with guide means forcing it to run with the piston surfaces perpendicular to the envelope surface of the cylinder. Also in this variant, an electric voltage is induced at the stroke of the piston 22 in the respective direction in the cylinder 20, in this case in the coil 21.

Figure 3:
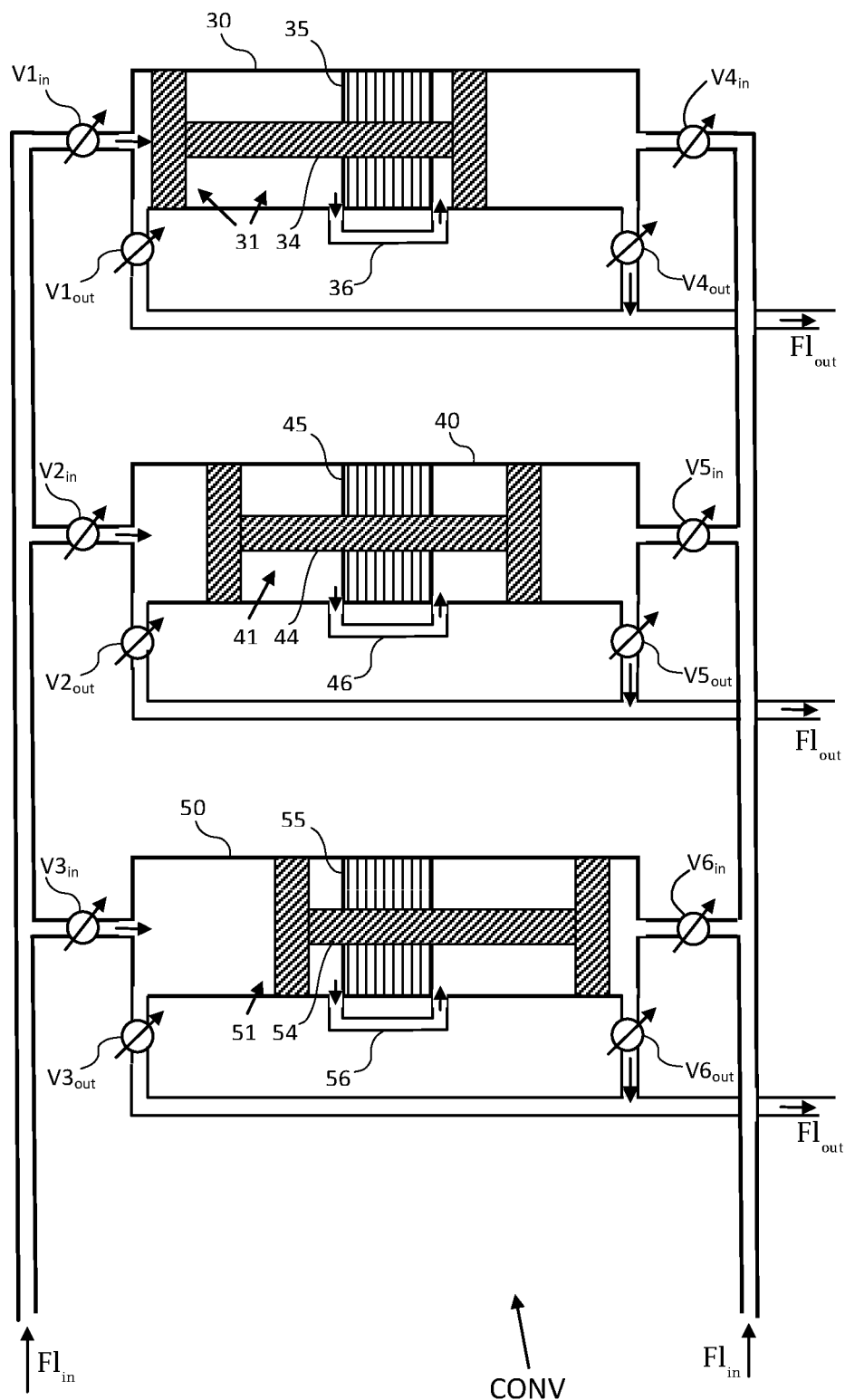
FIG. 3 shows a schematic representation of one example of a converting unit in which three cylinders according to FIG. 1 have been interconnected into a three-cylinder unit.

FIG. 3 shows a converting unit CONV, which in this example illustrates a three-cylinder unit based on the cylinder 10 described in FIGS. 1a and 1b above. Here, the cylinders are denoted by reference numerals 30, 40 and 50. The pistons are denoted by numerals 31, 41 and 51, and the coils by numerals 35, 45 and 55. The working fluid F1 is here passed to the respective cylinders 30, 40 and 50 during the first piston stroke thereof via the lefthand conduit and is here designated $F1_{in}$ in the figure. Since three cylinders are arranged in sequence, the control valves $V1_{in}$, $V2_{in}$, $V3_{in}$, $V4_{in}$, $V5_{in}$, and $V6_{in}$ are adapted to be opened in sequence with a phase shift of 120 degrees, such that the piston strokes start with the first piston 31 in a piston stroke to the right in the first cylinder 30 and terminates in a piston stroke to the left with the third piston 51 in the third cylinder in a completed cycle, whereafter the sequence is completed again. The working fluid F1 is passed to the respective cylinders 30, 40, 50 during the second piston stroke thereof via the righthand conduit, where the flow of working fluid is designated $F1_{in}$. As previously shown, the gas pressure between the inner spaces of the piston is equalized via overflow channels 36, 46, 56. Exhaust valves $V1_{out}$, $V2_{out}$, $V3_{out}$, $V4_{out}$, $V5_{out}$, and $V6_{out}$ are opened and shut as previously shown concurrently with the strokes of the pistons 31, 41, 51, whereby expanded gas F1, caused by the piston strokes, is fed out in due order through the conduits, where expanded working fluid is denoted $F1_{out}$. This expanded gas $F1_{out}$ is the gas that is returned into the heat cycle as expanded gas, which is subjected to pressure drop and temperature decrease.

The control of the inlet valves $V1_{in}$, $V2_{in}$, $V3_{in}$, $V4_{in}$, $V5_{in}$, and $V6_{in}$ is, in the present example, arranged such that each respective inlet valve at a cylinder sprays in hot gas F1 during approximately ⅕ of the length of stroke, that is during a pressure phase. After this, the respective valve is shut. The expansion phase of the hot gas F1 will then be an additional ⅘ of the length of stroke of the piston 10, 20, 30, 40, 50. If the length of stroke of each respective piston is, for example, 150 mm, this means that the pressure phase proceeds for the first 30 mm of the stroke of the piston. This procedure occurs in each direction for each respective piston. The process in a three-cylinder unit according to FIG. 3 then means that the first valve $V1_{in}$ is opened during a first pressure phase. When the piston 31 has run 30 mm, the first valve is shut, whereafter the second valve $V2_{in}$ is opened during the pressure phase of the second piston 41, that is, during that period when the second piston runs 30 mm in its cylinder 40. The process is then repeated in a corresponding way until hot gas F1 has been sprayed in through each one of the six inlet valves $V1_{in}$, $V2_{in}$, $V3_{in}$, $V4_{in}$, $V5_{in}$, and $V6_{in}$ cyclically and has performed work on the respective piston 31, 41, 51 in piston strokes in both directions of each respective cylinder 30, 40, 50.

Generally it may be said that the respective inlet valve ($V1_{in}$, $V2_{in}$, $V3_{in}$, $V4_{in}$, $V5_{in}$, $V6_{in}$) is opened during a pressure phase during which the respective piston 31, 41, 51 moves the distance x of its length of stroke L, whereby the piston during an expansion phase moves the distance L–x, where x is in the order of magnitude of ⅕ of L.

During a time when a piston at one end of a cylinder (30, 40, 50) performs a piston stroke, an outlet valve $V1_{out}$, $V2_{out}$, $V3_{out}$, $V4_{out}$, $V5_{out}$, $V6_{out}$ at the other end of the same cylinder is opened for outflow of expanded working fluid $F1_{out}$. Naturally, a valve controller is guiding the opening and closing of each valve according to a predetermined schedule, so hot and pressurized working fluid is timely guided to the valve to be opened and expanded working fluid timely let out through outlet valves. Said valve controller is not depicted in the drawings.

When the pistons 31, 41, 51 complete their piston strokes, at each such stroke an induced voltage is generated in due order in the coils 35, 45, 55 since the pistons are magnetic. Since the piston strokes are displaced in time by a phase shift of 120 degrees, a three-phase alternating current will be automatically generated. The use of the generated voltage and any modulation of current curves are not described here.

The cylinders 30, 40, 50 may advantageously be formed in a block of the same type as in combustion engines for vehicles, for example as a block of light metal or another metal, where inlet channels, outlet channels and cooling channels are incorporated into the block.

Figure 4:
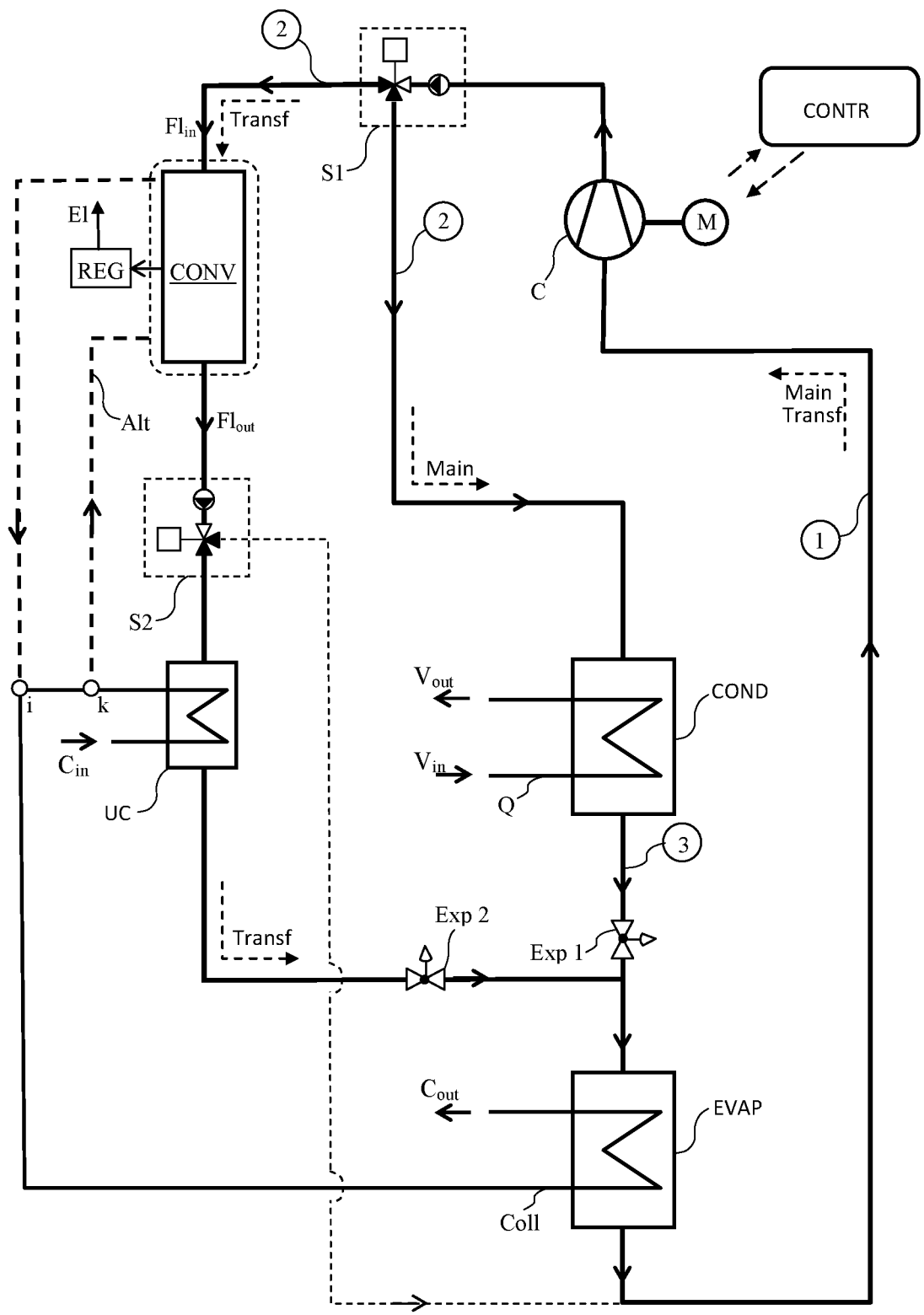
FIG. 4 shows a schematic representation in which a converting unit according to the invention is used in a heat cycle for converting low-value heat into both high-value heat and electrical energy.

FIG. 4 shows a heat cycle in which a converting unit CONV according to the invention is used. This shows a complete heat pump according to the invention including a converting circuit. A refrigerant, the working fluid F1, circulates in the main circuit, named Main, and in the converting circuit, named Transf. The working fluid may be chosen in dependence on the use of the heat pump. Different kinds of working fluids may be used for, for example, heating purposes and cooling plants. As an example, R407C may be mentioned, which is used, among other things, in pumps for geothermal heating.

In the following, the description is directed towards a heat pump that is used for heating dwellings based on extraction of energy from bedrock, lakes or ground. The examples given here regarding pressure, temperatures or other parameters are hereby related to a heat pump of that kind. If some other use of the heat pump according to the invention is applicable, this means that other values of parameters may be applicable.

Here, an overview is given of the data of the working fluid during its course through the heat pump cycle. The indicated values are only to be conceived as illustrative examples and may vary in dependence on the purpose in question. At point 1 in the figure, the working fluid F1 in the cycle is in gaseous state, the first state, and may then have a pressure of around 2 kPa and a temperature of around –5° C. When passing through the compressor C, the gas is compressed to the second state, which is a hot gas state (at 2). The pressure of the working fluid may then lie around 22 kPa and its temperature may amount to 120° C. The energy for compressing the working fluid in the compressor C is obtained by supplying electrical energy via the motor M. It is, of course, possible to supply energy to the compressor C with the aid of some other kind of mechanical work.

A first subflow of the working fluid, now in the form of hot gas, is forwarded in the main circuit Main to a condenser COND. The condenser is designed as a heat exchanger and in example in question, where the heat pump heats a dwelling, the condenser COND is traversed by a first medium which circulates in a heat circuit Q which may be in the form of radiators or floor-heating coils. In a known manner, the heat circuit Q has coils traversing the condenser. The first medium is usually water and is heated by the hot gas upon heat interchange with the working fluid as hot gas in the condenser. The heated water is circulated out into the heat circuit at $V_{out}$ and is returned, at reduced temperature, at $V_{in}$ in the condenser COND. Thus, heat is transported away from the condenser while utilizing the heat circuit. The heat delivered by the working fluid in the condenser results in a temperature reduction of the hot gas, which is therefore largely condensed into liquid. A gaseous/liquid state arises in the working fluid. This has been referred to here as the third state (at 3). In this third state, the pressure may amount to about 10 kPa and the temperature may have fallen to about 65° C. or lower, all depending on the energy output in the condenser.

From the condenser the working fluid is forwarded in the main circuit Main to an evaporator EVAP. Also the evaporator EVAP comprises a heat exchanger which in this case absorbs heat from a second medium, a refrigerant, which circulates in a collector circuit Coll. The second medium (the refrigerant) is in the form of a medium essentially in liquid phase, for example a spirit-water solution, which in the case of geothermal, lake or ground heating circulates in a coil (the collector circuit) for absorbing heat from the rock, the lake or the ground in a known manner. If, as an alternative, the evaporator is part of a cooling circuit, the refrigerant may circulate in, for example, a refrigerated counter or the like. In a cooling circuit, the refrigerant may be ambient air.

The collector circuit traverses the evaporator EVAP and forms therein a heat exchanger structure together with coils of the main circuit Main. The working fluid in the main circuit Main enters into the evaporator, essentially in liquid phase, and here absorbs heat from the refrigerant upon heat interchange therewith in the heat exchanger structure. Heat is supplied to the evaporator EVAP via the refrigerant which is introduced into the evaporator at its inlet $C_{in}$. This heat, added via the collector circuit, then evaporates the working fluid which is supplied to the evaporator essentially in liquid phase. The steam generation heat for the evaporation is obtained from the refrigerant. The refrigerant, thus cooled, is returned in the collector circuit to the heat source (rock, lake or ground) at the outlet $C_{out}$. In the case of cooling machines, the refrigerant is returned to the object that is cooled. In the case of an air-heating pump where the refrigerant is air, no collector circuit is needed since the working fluid F1 may be heat-exchanged with ambient air in a heat-exchanger battery.

The control of the amount of working fluid in gaseous/liquid phase that is allowed to enter the evaporator EVAP is normally controlled via an expansion valve Exp 1 which is located between condenser and evaporator and which, as mentioned, reduces the temperature and pressure of the working fluid supplied to the evaporator EVAP, essentially in liquid state. The operation of the heat pump circuit Main described so far in principle shows the function of a heat pump according to the prior art. According to this prior art, some energy is lost since the compressor C operates also when overpressure already exists in the circuit ahead of the expansion valve Exp 1.

In a heat cycle according to the above when using the converting unit, which constitutes the device according to the invention, a second subflow of the working fluid is passed in a bypass line past the condenser COND, whereby the working fluid F1 is diverted at a first shunt valve S1 downstream of the outlet of the working fluid from the compressor C. This subflow thus flows in the converting circuit Transf. In this subflow in the converting circuit Transf, the converting unit CONV is placed, which is traversed by the subflow before this is returned to the main circuit Main via a second shunt valve S2 to the inlet of the evaporator EVAP downstream of the expansion valve Exp 1 in the main circuit Main. In certain operating cases, the second shunt valve S2 may be opened for return of the subflow over the converting unit to the main circuit Main downstream of the evaporator EVAP.

Since the flow of the working fluid $F1_{out}$ out of the converting unit CONV still has too high a temperature and too high a pressure to be able to be returned to the main circuit Main upstream of the evaporator EVAP, a subcooler UC is arranged in the flow out of the converting unit. The subcooler UC, which is a condenser, is designed as a heat exchanger and in the example in question the subcooler UC is traversed by a medium which preferably is the refrigerant which also traverses the collector circuit Coll of the evaporator EVAP. Thus, heat is transferred from the working fluid to the refrigerant in a heat exchanger structure in the subcooler, which thus means that the pressure and the temperature are reduced in the working fluid such that this fluid may be returned to the main circuit Main via an expansion valve Exp 2. The refrigerant in the collector circuit Coll is in this case introduced at the inlet $C_{in}$ in the subcooler UC. The refrigerant is passed out from the collector circuit Coll of the heat pump at the outlet $C_{out}$ in the evaporator EVAP.

FIG. 4 also illustrates an alternative in which the refrigerant in a loop Alt may be brought to the converting unit CONV which may be enclosed, whereby the refrigerant is arranged to flow through the enclosure in a suitable way and absorb surplus heat from the unit CONV. When the loop Alt is used there is no longer any connection between points i and k in the figure. If this alternative is utilized, the converting unit will of course become more complicated to manufacture but is able to optimize energy absorption from the working fluid. In this case, the converting unit is cooled by means of the refrigerant in the collector circuit Coll, which then flows through the previously mentioned cooling channels. These cooling channels may be arranged in the motor block-like structure of metal mentioned above.

The converting unit CONV, which is a linear hot-gas generator, preferably with two or more cylinders according to the above description, is driven by the hot-gas flow consisting of a subflow, alternatively the whole flow, of the hot gas F1, which is the compressed working fluid out of the compressor C which via the first shunt valve S1 is controlled to flow through the converting unit CONV, whereby the linear hot-gas generator delivers electrical energy which may be used in a desirable manner. The hot-gas generator may, for example, produce electrical energy that may be used as a contribution for operation of the drive motor M of the compressor C. Alternatively, or simultaneously with feeding to the drive motor M, surplus electricity may be fed out onto an external electrical network. Hence, the converting unit CONV contributes to relieve the drive motor's M requirement of electrical energy in dependence on the surplus of energy which is available in the heat-pump circuit by the pressure and temperature drops that arise therein, and because of the increased available energy output from the collector circuit that is created by designing the heat-pump circuit and dimensioning the collector circuit in the manner described.

The compressor C may be a piston, scroll or screw compressor. The evaporator EVAP may, in its turn, be of the indirect evaporator type and is then usually in the form of a plate heat exchanger. Alternatively, the evaporation may take place directly in, for example, an evaporation coil for earth/lake heating or may consist of a flange battery for air. Preferably, the compressor C is a speed-controlled dc compressor.

When utilizing the converting unit CONV according to the invention, the evaporation may, in addition, have a shunted, fixed evaporation process by supplementing it with demand-controlled additional working fluid via the existing expansion valve Exp 1. This is done by the expansion valve being controlled by which value of the temperature absorption that the evaporation is allowed to have. By this method, maximum evaporation is achieved such that the compressor C is capable of carrying out work without the risk of a breakdown caused by so-called liquid knock.

FIG. 4 also shows a control unit CONTR. This control unit monitors the operating cases that may occur for the operation of the heat pump. Thus, the control unit CONTR controls start and stop of the compressor C, control of flows of working fluid at the shunt valves S1, S2, the expansion valves Exp 1 and. Exp 2, respectively, all the control valves at the converting unit CONV, and controls the voltage regulator REG that controls the voltage fed out from the generator of the converting unit. Control of a heat pump belongs to conventional technology, so the mode of operation of the control unit will not be described in detail here.

Functional description of the heat pump circuit.

Upon start-up, the shunt valve S1 is kept shut for gas flow through the converting unit CONV by means of control from the control unit CONTR. When the compressor C has attained working pressure with the aid of the controlled expansion valve Exp 1, the control unit CONTR provides opening impulses to the valve S1 which in stages controls a gas flow to the converting circuit Transf, whereby the converting unit CONV starts generating electric voltage to a voltage regulator REG, which regulates feed-out of the generated voltage. The shunt valve S1 is controlled via the voltage regulator REG and the control unit CONTR in such a way that the hot-gas flow controls the speed-controlled dc compressor C, which according to one aspect of the invention is preferably overdimensioned in relation to the requirement of heat in the heat circuit (alternatively, the requirement of "cooling" at the evaporator in the case of a refrigerating plant). The evaporator EVAP is directly fed with a restricted, controlled shunted gas/liquid flow of low pressure due to the fact that the pressure of the subflow passing via the converting circuit has fallen. The utilization of pressure and heat in the heat pump circuit according to the invention may be carried out in several alternative ways, of which only the preferred embodiments have been described here. A charging tank may also be integrated in the heat cycle. In this charging tank, pressure may then be built up during operation, whereby quick start-up of the heat pump may be achieved by utilizing pressure, available in the charging tank, in the circuit even from the start without the compressor C first having to be driven for a while before a pressure has been built up in order for the process to be able to reach the state for normal operation.

As mentioned before, the heat pump circuit described here may also be used in cooling machines. In these applications, it is cooling of an external medium at the evaporator EVAP that is desired, for example air as the second medium, which in the evaporator EVAP passes through cooling coils with working fluid absorbing heat from the air. If the invention described here is to be used in cooling machines, then, when designing the circuit, the starting-point is instead the cooling effect that is desired in the evaporator EVAP, instead of, as in the examples mentioned above relating to heating purposes, where it is the power demand in the heat circuit of the condenser than controls the design of the circuit.

Figure 5:
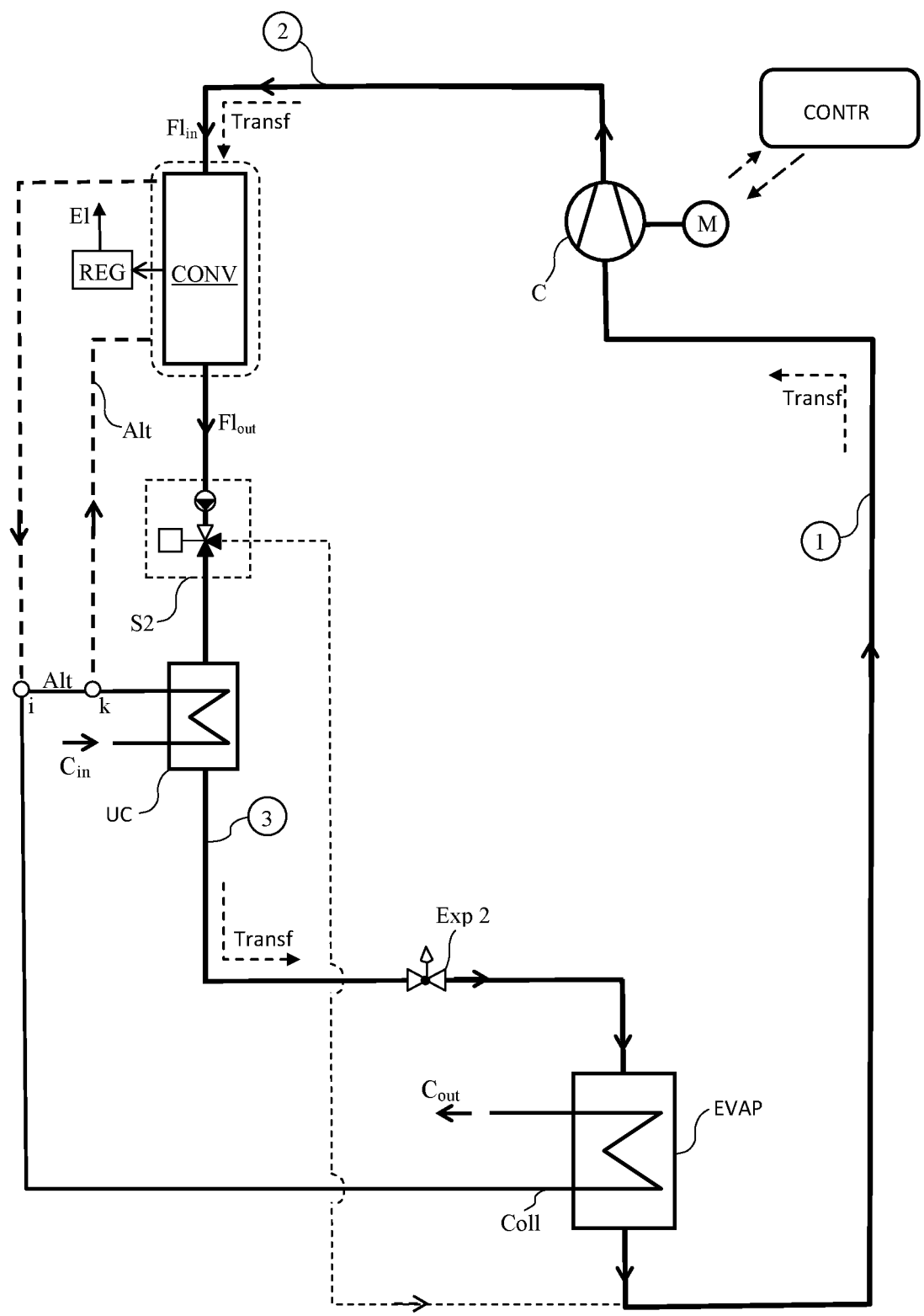
FIG. 5 shows a schematic representation of a heat cycle which is simplified in relation to FIG. 4, in which a converting unit is used for converting low-value heat into electrical energy only.

If the converting unit CONV is to be used in a heat cycle in a heat pump only for producing electricity, then one example of such a circuit is illustrated in FIG. 5. This circuit is the same as the circuit in FIG. 4 with the difference that the condenser COND is omitted, since heat is not be generated in any heat circuit. Instead, all extraction of energy is performed in the converting circuit which is designated Trans, where electrical energy is generated in the converting unit CONV. Thus, both the valve S1 and the Expansion valve Exp 1 are omitted.

In those cases where electrical energy is to be generated in cooling machines by means of a heat cycle in a heat pump according to the above, the refrigerant will be a refrigerant that circulates in the circuit Coll for cooling of objects, such as foodstuffs. If, in the case of cooling machines, it is a question of air-conditioning plants, the refrigerant consists of air which evaporates the working fluid in the evaporator EVAP. In these cases, the coils that transport a refrigerant in a collector circuit Coll may be omitted. Heat delivered in the condenser COND and the subcooler UC, respectively, may be delivered directly to the surrounding atmosphere or be utilized for heating purposes.

I claim:
1. An electric conversion device comprising:
   a. three cylinders, each cylinder having
      i. a first end;
      ii. a first valve, disposed at the first end, being configurable to supply a pressurized working fluid;
      iii. a second end;
      iv. a second valve, disposed at the second end, being configurable to release an expanded working fluid;
      v. a casing;
      vi. an induction coil disposed within the casing;
      vii. a piston having a magnetic portion, wherein the piston is moveable along a length of an axis of the cylinder of a length of a full stroke L; and
      viii. the first valve of each of the three cylinders is configurable to be open during a pressure phase wherein the piston moves a distance of approximately ⅕ of the length of the full stroke L, and whereby the piston during an expansion phase moves a distance of approximately ⅘ of the length of the full stroke L;
   b. a compressor to sequentially supply each of the first valves of the three cylinders with the working fluid, each first valve of a respective cylinder being configured to open at a time when an associated piston is at the position of full stroke L that is nearest to the first valve,
   wherein the first valve and the second valve of each cylinder are operable to be sequentially opened and closed, and
   wherein expansion of the working fluid forces each piston to mechanically move in a reciprocating motion within the three cylinders, and wherein the reciprocating motion of the pistons generate electricity between the magnetic portion of the piston and the induction coil; and wherein the first valves of each of the closed cylinder is configurable to receive the working fluid with a phase shift of 120 degrees between the valves.

2. The electric conversion device of claim 1, each piston comprising a magnetic piston rod having two ends and a piston disc disposed at each end of the piston rod, wherein each of the one or more cylinders is a two-stroke cylinder, and wherein the induction coil is disposed in a central portion of the casing of each of the one or more closed cylinders.

3. The electric conversion device of claim 2, further comprising an overflow channel to ensure gas is able to flow between the induction coil and the piston discs.

4. The electric conversion device of claim 1, wherein the second valves of each of the closed cylinders is configurable to permit outflow of the working fluid at a time when the piston is at a position nearest to the first valve.

5. The device of claim 1, wherein the induction coils of each of the three cylinders are connected to generate a three-phase alternating voltage.

6. The electric conversion device of claim 1, wherein the second valves of each of the closed cylinders are configurable to open for outflow of the working fluid at a time when the piston is at a position closest to the first valve.

7. The electric conversion device of claim 1, wherein the induction coils of each of the three cylinders are connected to generate a three-phase alternating voltage.

8. The electric conversion device of claim 3, wherein the first valves of each of the closed cylinders are configurable to open to receive the working fluid with a phase shift of 120 degrees between the valves.

9. The electric conversion device of claim 8, wherein the second valves of each of the closed cylinders open are configurable to permit outflow of the working fluid at a time when the piston is at a position closest to the first valve.

10. The device of claim 8, wherein the induction coils of each of the three cylinders are connected to generate a three-phase alternating voltage.

11. An electric conversion device comprising:
 a. three cylinders, each cylinder having
  i. a first end;
  ii. a first valve, disposed at the first end, being configurable to supply a pressurized working fluid;
  iii. a second end;
  iv. a second valve, disposed at the second end, being configurable to release an expanded working fluid;
  v. a casing;
  vi. an induction coil disposed within the casing;
  vii. a piston having a magnetic portion, wherein the piston is moveable along a length of an axis of the cylinder of a length of a full stroke L; and
  viii. the first valve of each of the three cylinders is configurable to be open during a pressure phase wherein the piston moves a distance of approximately ⅕ of the length of the full stroke L, and whereby the piston during an expansion phase moves a distance of approximately ⅘ of the length of the full stroke L;
 b. a compressor to sequentially supply each of the first valves of the three cylinders with the working fluid, each first valve of a respective cylinder being configured to open at a time when an associated piston is at the position of full stroke L that is nearest to the first valve, wherein the first valve and the second valve of each cylinder are operable to be sequentially opened and closed, and wherein expansion of the working fluid forces each piston to mechanically move in a reciprocating motion within the three cylinders, and wherein the reciprocating motion of the pistons generate electricity between the magnetic portion of the piston and the induction coil;

wherein each piston comprising a magnetic piston rod having two ends and a piston disc disposed at each end of the piston rod, wherein each of the one or more cylinders is a two-stroke cylinder, and wherein the induction coil is disposed in a central portion of the casing of each of the one or more closed cylinders; and wherein the first valves of each of the closed cylinders are configurable to open to receive the working fluid with a phase shift of 120 degrees between the valves.

12. The electric conversion device of claim 11, wherein the second valves of each of the closed cylinders are configurable to open for outflow of the working fluid at a time when the piston is at a position closest to the first valve.

13. The device of claim 11, wherein the induction coils of each of the three cylinders are connected to generate a three-phase alternating voltage.

14. The electric conversion device of claim 11, further comprising an overflow channel to ensure gas is able to flow between the induction coil and the piston discs.

15. An electric conversion device comprising:
 a. three cylinders, each cylinder having
  i. a first end;
  ii. a first valve, disposed at the first end, being configurable to supply a pressurized working fluid;
  iii. a second end;
   a second valve, disposed at the second end, being configurable to release an expanded working fluid;
  iv. a casing;
  v. an induction coil disposed within the casing;
  vi. a piston having a magnetic portion, wherein the piston is moveable along a length of an axis of the cylinder; and
  vii. the first valve of each of the three cylinders is configurable to be open during a pressure phase wherein the piston moves a distance of approximately ⅕ of the length of the full stroke L, and whereby the piston during an expansion phase moves a distance of approximately ⅘ of the length of the full stroke L;
 b. a compressor to sequentially supply each of the first valves of the three cylinders with the working fluid, each first valve of a respective cylinder being configured to open at a time when an associated piston is at the position of full stroke L that is nearest to the first valve, wherein the first valve and the second valve of each cylinder are operable to be sequentially opened and closed, and wherein expansion of the working fluid forces each piston to mechanically move in a reciprocating motion within the three cylinders, and wherein the reciprocating motion of the pistons generate electricity between the magnetic portion of the piston and the induction coil; and each piston comprising a magnetic piston rod having two ends and a piston disc disposed at each end of the piston rod, wherein each of the one or more cylinders is a two-stroke cylinder, and wherein the induction coil is disposed in a central portion of the casing of each of the one or more closed cylinders;

wherein the device further comprises an overflow channel to ensure gas is able to flow between the induction coil and the piston discs;

wherein the first valves of each of the closed cylinders are configurable to open to receive the working fluid with a phase shift of 120 degrees between the valves.

16. The electric conversion device of claim 15, wherein the second valves of each of the closed cylinders open are configurable to permit outflow of the working fluid at a time when the piston is at a position closest to the first valve.

17. The electric conversion device of claim 15, wherein the induction coils of each of the three cylinders are connected to generate a three-phase alternating voltage.

* * * * *